United States Patent [19]

Fürstenau

[11] Patent Number: 5,508,804
[45] Date of Patent: Apr. 16, 1996

[54] LASER INTERFEROMETER STRAIN SENSOR WITH ADJUSTABLE FEEDBACK AMPLIFICATION IN THE FORM OF A SAW-TOOTH PATTERN

[75] Inventor: Norbert Fürstenau, Braunschweig, Germany

[73] Assignee: Deutsche Forschungsanstatt fur Luft- und Raumfahrt e.V., Cologne, Germany

[21] Appl. No.: 218,741

[22] Filed: Mar. 28, 1994

[30] Foreign Application Priority Data

Mar. 27, 1993 [DE] Germany .......................... 43 09 994.7

[51] Int. Cl.⁶ .................................................. G01B 9/02
[52] U.S. Cl. ...................................... 356/345; 256/35.5
[58] Field of Search ................................. 356/345, 35.5, 356/352, 357, 358

[56] References Cited

U.S. PATENT DOCUMENTS

| | | | |
|---|---|---|---|
| 4,886,361 | 12/1989 | Furstenau | 356/345 |
| 5,066,128 | 11/1991 | Lu | 356/349 |
| 5,117,471 | 5/1992 | Furstenau | 356/345 |
| 5,402,230 | 3/1995 | Tian et al. | 356/345 |

FOREIGN PATENT DOCUMENTS

| | | |
|---|---|---|
| 3311809 | 3/1983 | Germany . |
| 3609507 | 3/1986 | Germany . |
| 122304 | 7/1982 | Japan . |

OTHER PUBLICATIONS

"Laser Diode Feedback Interferometer for Stabilization and Diplacement Measurements"; By: Toshihiko Yoshino; M. Nara; Sergay Mnatzakanian; Byron S. Lee; and Timothy C. Strand; Applied Optics; 1st Mar. 1987; pp. 892p14 897.

"Bistable Fiber–Optic Michelson Interferometer That Uses Wavelength Control"; By: Norbert Furstenau; Optic Letters; 1991; pp. 1896–1898, 1029 (1992).

"Fiber–Optic Doppler Velocimeter That Incorporates Active Optical Feedback From a Diode Laser"; By: W. M. Wang; W. J. O. Boyle; K. T. V. Grattan; and A. W. Palmer Optic Letters; 1992.

"Interrogation of a Remote Elliptical–Core Dual–Mode Fiber Strain Sensor by Using a Tandem Interferometer Configuration"; By: K. Bohnert; G. de Wit; and J. Nehring; Optic Letters; 1992; pp. 694–696.

"Remote Temperature Sensing Using Polarisation–Preserving Fibre"; By: M. Corke; A. D. Kersey; K. Liu; and D. A. Jackson; Electronic Letters Jan. 19, 1984 vol. 20 No. 2; pp. 68–69.

"Interferometric Optical Fibre Strain Measurement"; By: D. Uttam; B. Culshaw; J. D. Ward and D. Carter; J. Phys. E. Sci. Instrum. vol. 18, 1985; pp. 290–293.

"Elliptical Core Two–Mode Fiber Strain Gauge With Heterodyne Detection" By: J. N. Blake; Q. Li; and B. Y. Kim; Optical Fiber Sensors 1988 Technical Digest Series, vol. 2, Part. 1; Jan. 27–29, 1988; pp. 416–419.

Primary Examiner—Samuel A. Turner
Assistant Examiner—Robert Kim
Attorney, Agent, or Firm—Salter & Michaelson

[57] ABSTRACT

An interferometer strain sensor or gauge comprises a laser diode coupled to an interferometer with an opto-electric output converter, the output of which is supplied via a differentiating unit to an interference-fringe counter and via a feedback amplifier to the current supply of the laser diode to vary the wavelength thereof, the interference signal being in the form of a saw-tooth pattern with steep edges to produce rapid transitions for the differentiating unit.

10 Claims, 2 Drawing Sheets

LASER INTERFEROMETER STRAIN SENSOR WITH ADJUSTABLE FEEDBACK AMPLIFICATION IN THE FORM OF A SAW-TOOTH PATTERN

BACKGROUND OF THE INVENTION

The present invention relates to an interferometer strain sensor or extensometer.

One type of interferometer strain gauge includes a laser diode as the light source with a subsequently connected optical isolator and optical focusing means, an interferometer, which is alterable in its length by a strain, a single mode fibre as light guide between the optical focusing means and the interferometer, a directional coupler in the single mode fibre between the optical focusing means and the interferometer, an opto-electric converter which is connected via a multi-mode fibre to an output arm of the directional coupler, and an up-down counter arranged subsequent to the opto-electric converter for counting the electrical output signals of the opto-electric converter produced by the interference fringes as a result of the strain of the interferometer.

In a known strain sensor of this type (DE 37 15 693 C1), one of the output arms of the two-arm interferometer is connected to a graduated index lens behind which a polarisation beam splitter is arranged wherein, instead of such a combination, a fibre optic polarisation beam splitter could also be provided. The respective phase displaced sinusoidal interference signals at the outputs of the polarisation beam splitter are connected to a photo-diode, pre-amplifier combination the outputs of which are connected to an electronic read-out means by means of which the interference signals are detected and supplied, with the correct prefix sign, to an up-down counter the counting value of which indicates the elongation or extension of the fibre relative to the initial state.

For the realisation of optical switches and logic elements for applications in optical computers and signal processors, optical bistability is required. For this purpose, a varying input signal is converted into discrete output states in the form of light intensities. The basis for this is a hysteresis curve which results from the (G-u*-) input-output characteristic upon which steady values of the output intensities, which are the basis for the bistability, are obtained as a function of the input intensities or of the feedback amplification.

A bistable optical switch is known which has a two-arm interferometer that has two signal outputs of which one is connected to a photo-diode of an opto-electric converter, the output voltage of which is amplified and applied to the current supply of the light source as a control voltage. The respective interferometer arms are constructed with constant, different optical path lengths and the difference in the path lengths of the interferometer arms is so determined, and the wavelength of the input light applied to the two-arm interferometer is so alterable, that the output light of the two-arm interferometer is switched bistably between its signal outputs by the alteration of the wavelength of the input light. (DE 40 21 293 A1; U.S. Pat. No. 5,117,471; Optics Letters, 1 Dec 1991/ Vol 16, No 23, pages 1896–1898 "Bistable fiber-optic Michelsen interferometer that uses wavelength control").

It is known furthermore, to generate asymmetrical interference signals by means of a "self-mixing" interferometer. The sensor light is fed back into the laser diode where a saw-toothed intensity modulation corresponding to the movement of the reflector is brought about by a spectral line width or resonator Q-factor modulation produced by interference between an external reflector at the location of the sensor and one of the laser mirrors (Optics Letters, 1992/Vol 17, No 11, pages 1–3, "Fiber-optic Doppler velocimeter that incorporates active optical feedback from a diode laser"— authors: W. M. Wang et al.)

SUMMARY OF THE INVENTION

The present invention seeks to provide an interference strain sensor having a large dynamic range.

According to the present invention there is provided an interferometer strain gauge comprising a laser diode as a light source, said laser diode having a current supply, an interferometer, said interferometer being alterable in its length by a-strain or extension and being arranged to produce interference fringes as a result of a said strain or extension, a directional coupler having an output arm, an opto-electric converter connected to said output arm of said directional coupler and being arranged to produce respective electrical output signals in response to said interference fringes, and a converter arranged subsequent to said opto-electric converter, said converter being arranged to count said electrical output signals, wherein said electrical output signals of said opto-electric converter are fed as feedback signals via a feedback amplifier to said current supply of said laser diode, said feedback amplifier having an adjustable amplification factor, and said directional output signals of said opto-electric converter are also fed to said converter, and wherein said amplification factor is selected in dependence upon said laser diode current supply such that said electrical output signals of said opto-electric converter are in the form of a saw-tooth pattern.

BRIEF DESCRIPTION OF THE DRAWINGS

Preferred embodiments of the present invention will now be described by way of example only with reference to the accompanying drawings, of which.

DESCRIPTION OF THE PREFERRED EMBODIMENTS

Basically the present invention provides an interferometer strain gauge comprising a laser diode as a light source, an interferometer, which is alterable in its length by a strain or extension, a directional coupler, an opto-electric converter which is connected to an output arm of the directional coupler, and a counter arranged subsequent to the opto-electric converter for counting the electrical output signals of the opto-electric converter produced by the interference fringes as a result of the strain of the interferometer, wherein the electrical output signals of the opto-electric converter are connected as a feedback signal via a feedback amplifier having an adjustable amplification factor to the current supply of the laser diode and to the counter and the amplification of the feedback signal is selected in dependence on the laser diode current such that the output signals are in the form of a saw-tooth pattern.

The strain sensor in accordance with the invention is distinguished from the known interferometer strain sensors in that an asymmetrical saw-toothed interference signal, which can be evaluated by means of a special, simple electronic read out means, is produced instead of two phase displaced sinusoidal interference signals.

Figure 1:
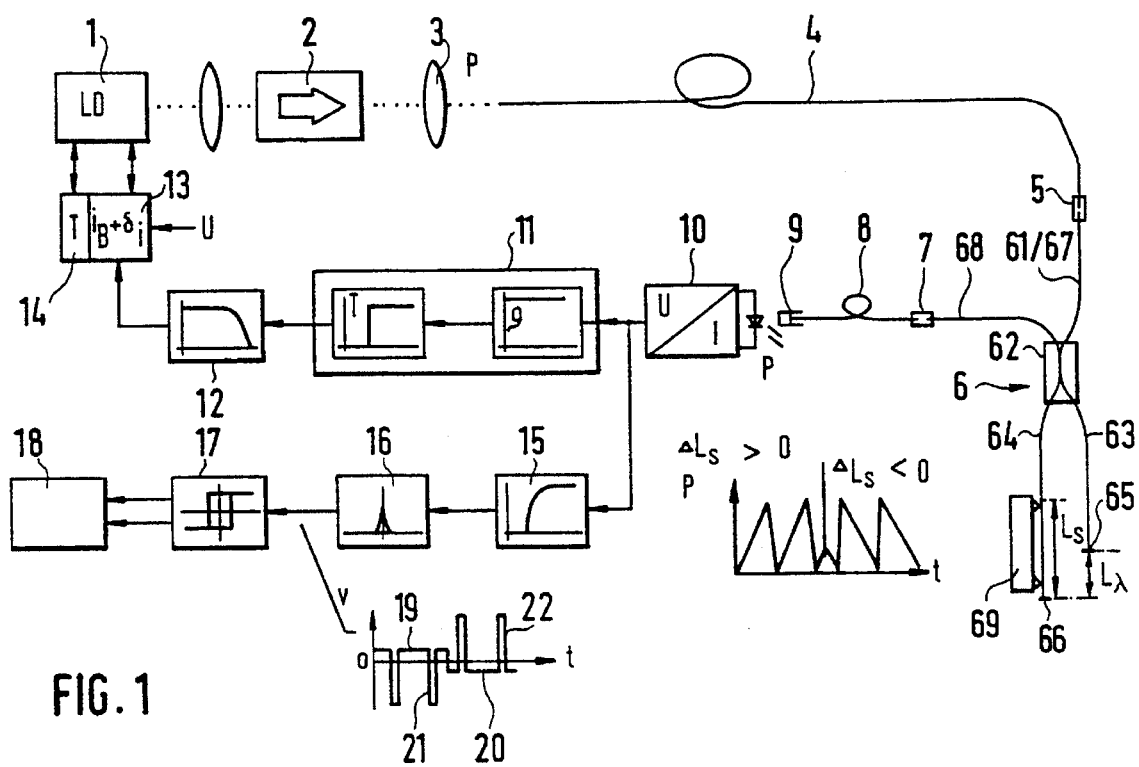
FIG. 1 shows the circuit of the strain sensor carried into effect by means of a fibre optic two-arm interferometer of the Michelson type.

Referring now to the drawings, in FIG. 1, a circuit is illustrated as embodied in a strain sensor or gauge which is constructed as a two-arm interferometer of the Michelson type. It is known that, apart from having a sensitivity which is higher by about the factor 2, the Michelson interferometer is identical in operation with a Mach-Zehnder interferometer which may likewise be used as a strain sensor.

The light source for the feedback bistable interferometer is a laser diode 1 whose pencil of light is coupled into a single mode fibre 4 after passage through an optical isolator 2 having a suitable optical focusing means 3. The single mode fibre is connected via a splice or single mode combiner 5 to the input optical waveguide of the interferometer 6. The light wave is divided in a directional coupler 62 into respective 50% portions in the two arms 63 and 64 of the interferometer 6. These two arms 63 and 64 are of unequal length. This lack of symmetry in the optical path lengths of the interferometer arms is essential for the functioning of the bistability of the sensor. An interference signal is produced in the directional coupler 62 by the superimposition of the two light waves after reflection at the mirrored end faces 65, 66 of the interferometer arms 63, 64. It is known from the theory of the two-arm interferometer, that interference signals, respectively phase displaced by $\pi$ (=180°), will be observed in the output arms 67 and 68—output arm 67 is identical with the input arm 61—of the directional coupler 62 i.e. the output 68 shows a maximum intensity (constructive interference) when the output 67 exhibits minimum intensity (destructive interference).

A multi-mode fibre 8, whose other end is connected via a splice or multi-mode combinet 9 to an opto-electric converter 10, is connected via a splice or multi-mode combinet 7 to the output 68 of the directional coupler 62. The opto-electric converter 10 is constructed as a photo-diodes, pre-amplifier combination having a conversion factor $\eta$ in which the optical luminous power (intensity) at the output 68 of the directional coupler 62 is converted into a voltage proportional thereto. This voltage is applied to an amplifier 11 having the amplification factor g and a delay time T.

The amplified output voltage is applied via a low pass filter 12 as a control voltage to the current supply. 13 of the laser diode 1 to which the signal is thus fed back (conversion factor luminous power/diode current= $k_{LD}$). The offset current ib=$i_{total}$−$i_{threshold}$ determines the basic wavelength of the laser diode. The laser diode current and hence the wavelength is modulated via the feedback coupling. The temperature variations of the laser diode mounted on a Peltier cooling means are stabilised to better than $10^{-2}$ K° by a temperature stabilising unit 14. The basic wavelength may also be displaced by the temperature over a specific range. The amplification factor g of the amplifier 11 is adjustable and determines the asymmetry of the interference fringes, the linearity of the slow edge and the slope of the fast edge.

From the output 15 of the photo-diodes, pre-amplifier combination, its output voltage is connected further to an interference fringe counting circuit having a high pass filter 15, a differentiating unit 16, an electronic switch and an up-down counter 18.

The difference in length of the two interferometer arms 63, 64, which are mirrored at their ends in the usual manner, amounts to $L_\lambda$. The expansion range of the interferometer arm 64 is referenced by $L_S$. The expansion range $L_S$ of the interferometer arm 64 is established by the probe 69 whose alterations in length $\Delta LS$ are to be measured. Upon alterations of this length, a sawtoothed interference signal is produced via the feedback circuit which results in saw-toothed signals having opposed edge slope, in the circuit, of the output power Pout versus the time t. For contractions—$\Delta LS<0$ and for extensions—$\Delta LS>0$, as illustrated in the diagram. Due to the differentiating unit 16 having the pre-connected high pass filter 15, constant voltage levels (19, 20) are produced from these saw-toothed interference signals, which voltage levels are positive or negative in dependence on the prefix sign of the alteration in the measured value and which, during the trailing edge of the saw-tooth which is fast as possible, are interrupted by negative or positive voltage pulses, as is illustrated at the foot of the diagram of the circuit in accordance with FIG. 1. These voltage pulses 21, 22 having a large dynamic range are applied to the succeeding electronic switching unit 17 from which, in dependence on the prefix signs of the voltage pulses, corresponding counting pulses are given to the up or down input of the up-down counter 18.

The above mentioned arrangement is a non-linear feedback system having a time constant g and a feedback delay time T. The steady state behaviour is described by the recursiva equation $$P_{n+1} = \frac{TK_{LD}}{4(1+\mu)} (i_B + gk\eta P_n)[1 + \mu \cos(-K_\Phi P_n + \Phi_B + \Phi_L + \delta\Phi_M(\delta nL))]. \quad (1)$$

$P_n$ is the output power on the photo-diode at the time $t_n$; $\mu$ is the interference contrast (modulation index) of the interferometer, T is the interferometer transmission; $i_B$=$i_{LD}$−$i_{threshold}$ is the constant offset current component through the laser diode above the laser threshold current; $\eta$=$\delta U/\delta P$ is the conversion factor of the interferometer - output power to photo-diode voltage, k=$di_{LD}/dU$ the conversion factor of the voltage at the laser diode input to laser diode current, g is the amplification factor of the feedback amplifier, $K_{LD}$=$dP_O/di_B$ the conversion factor of laser diode current to laser output power $P_O$ $$P_{LD} = K_{LD}(i_B + gk\eta P_n) \quad (2)$$
$$= P_o + g P_n$$

$K\Phi$ describes the alteration of the interferometer phase conveyed by the interferometer output power via the feedback coupling. The cause of this is the diode current alteration and thus the associated wavelength alteration which is controlled by the output luminous power.

The total interferometer phase difference is composed of a constant component $\Phi_O$=$\Phi_B$+$\Phi_L$ and a small variable component $K_\Phi P_n$+$\Gamma\delta L$:

$$\Phi \text{ tot} |_n = \Phi_B + \delta\Phi_{\lambda n}(\delta\lambda) + \Phi_L + \delta\Phi_M(\delta(nL)) \quad (3)$$

The phase difference due to the difference in length L of the interferometer arms is defined for $\lambda_O$=$\lambda(i_B$=0):

$$\Phi_L = \frac{2\pi}{\lambda_O} n L. \quad (4)$$

$\Phi_L$ is of the order of magnitude $10^5 \pi$ rad (L=10 mm, $\lambda$=830 nm). The alteration of the interferometer phase $\delta\Phi_M$ results from the fibre elongation $\delta L$. The offset phase $\Phi_B$ is laid down by $i_B$ and determines the basic wavelength $\lambda B$. The following applies for the offset phase $$\Phi_B = -\Phi_A \Delta\lambda(i_B)/\lambda \tag{5}$$

$$\begin{aligned}\delta\Phi_\lambda &= -\Phi\delta\lambda/\lambda \tag{6}\\ &= -K_\lambda \,\delta\lambda \\ &= -K_\lambda K_{\lambda i}\delta i \\ &= -K_i\,\delta_i\end{aligned}$$

where $K_\lambda=-2\pi n\,L/\lambda^2$ and $K_\lambda i = d\,\lambda/di$. The alteration of the wavelength with the current for a fixed laser mode of the order m is, in the case of a temperature stabilised laser diode, of the order of magnitude $$\delta\lambda_m/\delta i\,|_{T_{Ws}} = 0.01 \text{ nm/mA} \tag{7}$$

$T_{Ws}$ is the temperature of the heat sink. A phase change of $2\pi$ is then obtained by $$\Phi=2\pi=-\Phi_0\Delta\lambda/80 \tag{8}$$

There thus results from (3) e.g. for a difference in length L of the interferometer arms of L=20 mm in the case of a Michelson interferometer ($\Phi_L$ is greater by the factor 2 since the light wave traverses the measurement path twice), a required alteration of wavelength of $\Delta\lambda=0.012$ nm (wavelength=860 nm, refractive index n= 1.46)

Since $\lambda$ is approximately proportional to the diode current and temperature in the region between the mode changes of the laser diode and this parameter, for its part, varies proportionally to the output power from the interferometer, the total phase difference at the time tn may be written as:

$$\Phi tot\,|_n = \Phi_B - K_\Phi P_n + \Phi_L + \Gamma\delta L \tag{9}$$

$\Gamma=\Delta\Phi h//\Delta L=2\,(2\pi n/L)\,k_p$ is the sensitivity of the interferometer as a strain sensor. For a wavelength of $\lambda=860$ nm, it amounts to 2.69 $2\pi$ rad/µm. The material constant $k_p=\Delta\Phi/\Phi$ is a function of the elasto-optic co-efficients and of the refractive index.

The factor of proportionality $K\Phi$ is defined by $\delta\Phi_\lambda=-K_\Phi P_n=-K_i g\kappa\eta P_n(\text{c.f}(2))$.

This results in $$K_\Phi=K_\lambda K_{\lambda i}g\,\kappa\eta \tag{10}$$

The light intensity can be switched, jump-like, from a stable "Low" to a stable "High" state by a short pulse in the input intensity. This is associated with a change in wavelength of some $10^{-2}$ nm (in dependence on the difference in length of the interferometer arms). Due to the known hysteresis characteristic of bistable arrangements, small changes of the wavelength do not cause any noticeable alterations of the output intensity (stabilisation property)—apart from the transition points. For switching over to the original "Low" state, the wavelength has to be reduced below the value at the last switch over point e.g. by a short term interruption of the input luminous power. In the arrangement described here, the input luminous power is only affected by the feedback coupling on the laser diode current, but otherwise it remaines constant. On the other hand, the difference in lengths of the interferometer arms is now varied by the fibre elongation.

In the equation (1) for the output power at the time t, the feedback is expressed by the dependence of the laser diode current and the interferometer phase (versus the wavelength) on the output power at the time t-T. The manner of operation of this bistable interferometer can thus be explained in that one requires the simultaneous fulfilment of both the usual interferometer equation (output power as a function of the phase) and the equations for the dependence of the phase and of the current on the output power. For steady states of the system, all three equations must be satisfied at the same time so that the permissible solutions are given by the intersection points of the corresponding graphs. In the following, the normalised voltages u*=U*/U with $U_\pi=\pi g\,n/K\Phi=-\lambda^2/(nLk_{\lambda i}K)$ will be quoted instead of the luminous powers. The equations that have to be simultaneously satisfied are then expressed as $$u^* = \frac{g\eta\,T k_{LD} i}{U_\pi(1+\mu)}\,[1+\mu\cos\Phi_{tot}] \tag{11}$$

as the interferometer characteristic. Furthermore $$u^* = \frac{1}{4\pi}\,(\Phi\cdot\Phi_L - \Phi_B - \delta\Phi_M) \tag{12}$$

for the relationship between output signal and phase due to the feedback on the wavelength (via the diode current). And, moreover $$u^* = \frac{(i\cdot i_B)}{k U_\pi} \tag{13}$$

due to the direct modulation of the laser power by the feedback of the interference signal on the diode current. For the steady fixed datum points, one obtains from (1) in normalised style, the equation $$u^* = \frac{G}{1+\mu}\,(u^* + u_B)[1+\mu\cos(\pi(u^* + u_0 + u_M))], \tag{14}$$

Figure 2:
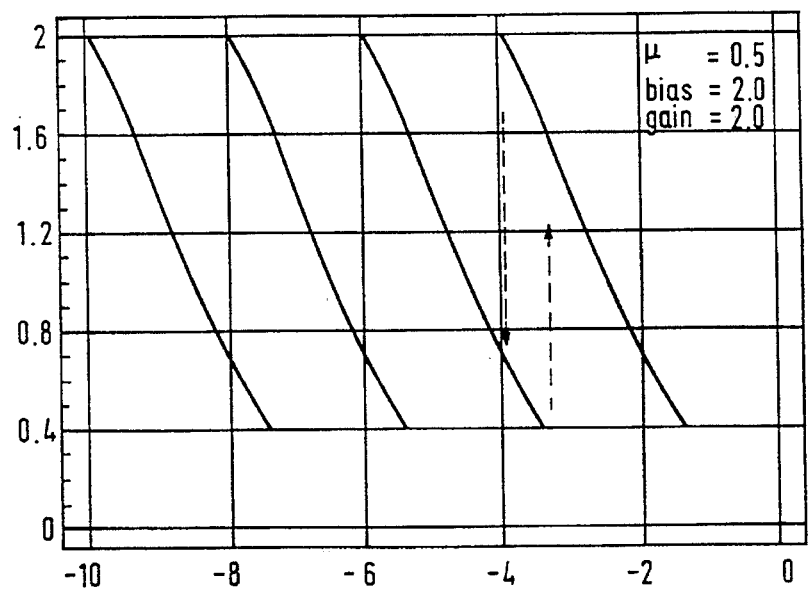
FIG. 2 is a diagram in which the steady interferometer characteristic is illustrated.

(with G=T g $K\eta\,K_{LD}$). Equation (14) describes the typical hysteresis-like dependence of the steady fixed datum point u, on the normalised input luminous power or the feedback amplification G [5, 7]. In connection with the sensor application proposed here, the dependence of the steady output signal on the phase change uM induced by the measurement value is of interest. Due to the bistable behaviour of the feedback system described above, the periodic function u*(uM) results in a saw-toothed characteristic. The time sequence of slow and rapid edges of the saw-toothed interference fringes changes its prefix sign with the alteration in prefix sign of the change in the measurement value (increasing or decreasing elongation). This can be appreciated from FIG. 2 in which the steady interferometer characteristic (13) is illustrated by u, as a function of $u_L$ for a certain set of parameters u, uO, G. The alteration of the prefix sign of the edge slope correlated to the alteration of the prefix sign of the change in the measurement value (fibre expansion) allows the assignment of a prefix sign for the incremental read-out of the signal (interference fringe count) by differentiating the output signal.

Figure 3:
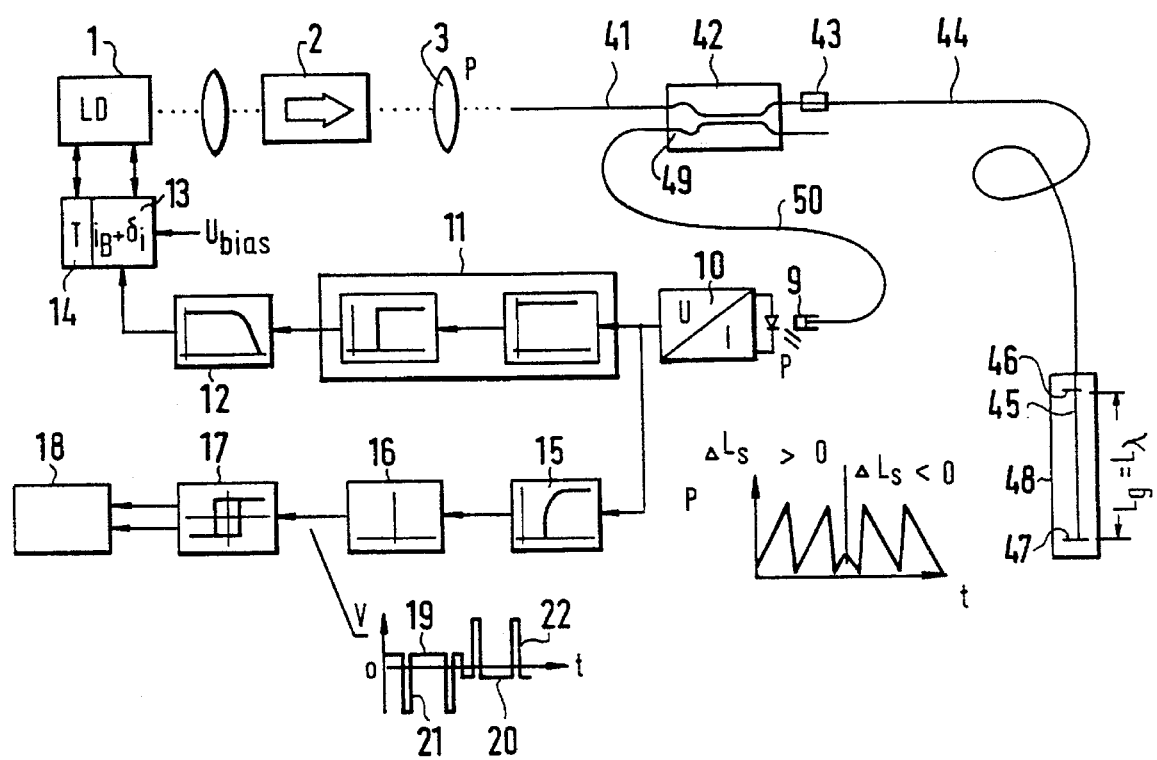
FIG. 3 shows the circuit of a strain sensor carried into effect by means of a fiber optic Fabry-Perot resonator as the interferometer.

A Fabry-Perot resonator of the optical waveguide type serving as a strain sensor is provided as the interferometer for the embodiment in accordance with FIG. 3. The Fabry-Perot resonator 45, which is provided with mirrors 46, 45 at its two ends, is connected to a single mode fibre 44, which is connected via a splice or plug 43 to the output of a directional coupler 42 whose input is connected to a single mode fibre 41 in which the optical power is fed. The interference signal present at the output 49 of the directional coupler 42 is connected via a single mode fibre 50 having a plug 9 to the opto-electric converter 10. The Fabry-Perot resonator 45 is attached to a probe 48 whose alterations in length are to be measured.

The Fabry-Perot resonator should have a reflectivity of $\leq 20\%$.

The Fabry-Perot in accordance with FIG. 3 otherwise corresponds to that in accordance with FIG. 1 and the theory provided for the embodiment in accordance with FIG. 1 is also applicable for the Fabry-Perot embodiment in accordance with FIG. 3.

The Fabry-Perot strain sensor or gauge in accordance with FIG. 3 is distinguished by its greater simplicity vis á, vis that in accordance with FIG. 1. Only one fibre needs to be led from the directional coupler 42 to the test point. In contrast, for an interferometer of the Michelson type, the directional coupler, which is a part of the interferometer, has to be arranged at the test point itself. Thus, for greater distances, two fibres have to be led to the test point.

It will be understood that the above description of the present invention is susceptible to various modifications, changes and adaptations.

What is claimed is

1. An interferometer strain gauge comprising a laser diode as a light source, said laser diode having a current supply, an interferometer, said interferometer being alterable in its length by a strain or extension and being arranged to produce interference fringes as a result of said strain or extension, a directional coupler having an output arm, an opto-electric converter connected to said output arm of said directional coupler and being arranged to produce respective electrical output signals in response to said interference fringes, and a counter arranged subsequent to said opto-electric converter, said counter being arranged to count said electrical output signals, wherein said electrical output signals of said opto-electric converter are fed as feedback signals via a feedback amplifier to said current supply of said laser diode, said feedback amplifier having an adjustable amplification factor, and said electrical output signals of said opto-electric converter are also fed to said counter, and wherein said amplification factor is selected in dependence upon said laser diode current supply such that said electrical output signals of said opto-electric converter are in the form of a saw-tooth pattern.

2. A strain gauge according to claim 1, wherein said electrical output signals of said opto-electric converter are connected to said counter via a differentiating unit and an electronic switching unit, and said sawtooth pattern of said electrical output signals has steep edges in order to produce rapid transitions for said differentiating unit.

3. A strain gauge according to claim 2, wherein a high pass filter is connected prior to said differentiating unit.

4. A strain gauge according to claim 1, wherein a temperature stabilising means and a controllable current supply are provided for varying the wavelength of said laser diode.

5. A strain gauge according to claim 1, wherein an optical isolator and optical focusing means are connected after said laser diode, and said directional coupler is arranged in a single mode fibre between said optical focusing means and said interferometer and said opto-electric converter is connected to said output arm of said directional coupler via a multi-mode fibre.

6. A strain gauge according to claim 1, wherein there is provided as said interferometer a two-arm interferometer having different length arms, one of said arms being alterable in length.

7. A strain gauge according to claim 1, wherein there is provided as said interferometer a Fabry-Perot resonator of the optical waveguide type said resonator being alterable in length.

8. A strain gauge according to claim 7, wherein said Fabry-Perot resonator has a reflectivity of $\leq 20\%$.

9. A strain gauge according to claim 1, wherein a low pass filter is connected subsequent to said feedback amplifier.

10. An interferometer strain gauge comprising a laser diode as a light source, said laser diode having a current supply and having subsequently connected thereto an optical isolator and optical focusing means, an interferometer, said interferometer being alterable in its length by a strain or extension and being arranged to produce interference fringes as a result of said strain or extension, a single mode fiber being provided as a light guide between said optical focusing means and said interferometer, a directional coupler being provided in said single mode fiber and having an output arm, an opto-electric converter connected via a multi-mode fiber to said output arm of said directional coupler and being arranged to produce respective electrical output signals in response to said interference fringes, and an up-down counter arranged subsequent to said opto-electric converter, said counter being arranged to count said electrical output signals, wherein said laser diode has a temperature stabilizing means and said current supply is controllable for producing a varying wavelength output of said laser diode, wherein said electrical output signals of said opto-electric converter are fed as feedback signals via a feedback amplifier to said current supply of said laser diode, said feedback amplifier having an adjustable amplification factor, and said electrical output signals of said opto-electric converter are also fed via a differentiating unit and an electronic switching unit to said counter, and wherein said amplification factor is selected in dependence upon said laser diode current supply such that said electrical output signals of said opto-electric converter are in the form of a saw-tooth pattern having steep edges in order to produce rapid transitions for said differentiating unit.

\* \* \* \* \*